(12) United States Patent
Vaghi

(10) Patent No.: US 6,509,532 B1
(45) Date of Patent: Jan. 21, 2003

(54) ELECTRONIC SCALE

(75) Inventor: Nino R. Vaghi, Bethesda, MD (US)

(73) Assignee: Vaghi Family Intellectual Properties, McLean, VA (US)

( * ) Notice: Subject to any disclaimer, the term of this patent is extended or adjusted under 35 U.S.C. 154(b) by 0 days.

(21) Appl. No.: 09/694,060

(22) Filed: Mar. 2, 2001

Related U.S. Application Data

(63) Continuation of application No. 09/303,663, filed on May 3, 1999, now Pat. No. 6,194,671.

(51) Int. Cl.$^7$ .................. G01G 19/40; G01G 21/28; G01G 19/413
(52) U.S. Cl. ............ 177/25.13; 177/144; 177/170; 177/238; 177/25.15; 705/407; D10/87; D10/91
(58) Field of Search ............... 177/25.13, 126, 177/127, 144, 170, 238, 245, 25.15, 2; 705/407; D10/87, 88, 91

(56) References Cited

U.S. PATENT DOCUMENTS

| | | | | | |
|---|---|---|---|---|---|
| 1,887,986 A | * | 11/1932 | Baldwin | ...................... | 177/126 |
| 2,181,272 A | * | 11/1939 | Greenleaf | .................... | 177/126 |
| 2,441,037 A | * | 5/1948 | Sherrin | ........................ | 177/126 |
| 2,685,441 A | * | 8/1954 | Baade | ........................ | 177/244 |
| 2,872,178 A | * | 2/1959 | Holland | ...................... | 177/126 |
| 2,926,443 A | * | 2/1960 | Townsend et al. | .......... | 177/126 |
| 3,097,712 A | * | 7/1963 | Johnson | ...................... | 177/126 |
| 3,799,282 A | * | 3/1974 | Schmidt | ...................... | 177/230 |
| 4,084,242 A | * | 4/1978 | Conti | ........................ | 177/25.15 |
| 4,120,371 A | * | 10/1978 | Zohn et al. | ................. | 177/262 |
| 4,288,131 A | * | 9/1981 | Griffin | ........................ | 177/126 |
| 4,351,403 A | * | 9/1982 | Ferguson | ...................... | 177/2 |
| 4,351,505 A | * | 9/1982 | Wickersham | ............... | 177/126 |
| 4,582,151 A | * | 4/1986 | Mairot et al. | ................ | 177/144 |
| 4,597,457 A | | 7/1986 | Ikekita | ..................... | 177/25.15 |
| 4,601,355 A | * | 7/1986 | Takahashi | ....................... | 177/2 |
| 4,602,693 A | * | 7/1986 | Racicot | ....................... | 177/262 |
| 4,638,439 A | | 1/1987 | Daniels | ....................... | 705/407 |
| 4,696,360 A | * | 9/1987 | Homen | ........................ | 177/262 |
| 4,700,791 A | * | 10/1987 | Iwasaki et al. | ................ | 177/2 |
| 4,726,435 A | * | 2/1988 | Kitagawa et al. | ........... | 177/187 |
| 4,799,559 A | * | 1/1989 | Mürdter et al. | .............. | 177/124 |
| D300,124 S | * | 3/1989 | Bungener | ..................... | D10/91 |
| 4,814,995 A | | 3/1989 | Daniels, Jr. | .................. | 705/402 |
| D302,798 S | | 8/1989 | Wolffe, Jr. | .................... | D10/91 |
| 4,875,533 A | * | 10/1989 | Mihara et al. | ............... | 177/245 |
| D305,103 S | | 12/1989 | Kennedy | ...................... | D10/91 |
| D329,227 S | | 9/1992 | Kurth et al. | ................ | D14/100 |
| 5,254,812 A | * | 10/1993 | Hilford | ........................ | 177/262 |
| 5,307,281 A | * | 4/1994 | Wollmann | ................ | 177/25.15 |
| 5,496,972 A | * | 3/1996 | Demar et al. | ................ | 177/126 |
| 5,567,918 A | * | 10/1996 | Bachmann et al. | ....... | 177/25.13 |
| 5,606,507 A | * | 2/1997 | Kara | ........................... | 705/408 |
| 5,608,193 A | * | 3/1997 | Almogaibil | .............. | 177/25.13 |
| 5,615,120 A | | 3/1997 | Schwartz et al. | ............ | 705/407 |
| 5,724,245 A | | 3/1998 | Maher et al. | ................ | 705/408 |
| 6,013,878 A | * | 1/2000 | Schwartz et al. | ......... | 177/25.13 |
| 6,194,671 B1 | * | 2/2001 | Vaghi | ...................... | 177/25.15 |
| 6,249,778 B1 | * | 6/2001 | Vaghi | .......................... | 705/407 |

* cited by examiner

Primary Examiner—Randy W. Gibson
(74) Attorney, Agent, or Firm—Fleshner & Kim, LLP

(57) ABSTRACT

An electronic scale integrally formed within the housing of computer keyboard. The scale includes an item holder which may be removably attached to a weighing unit mounted in a clearance region located at a rear portion of the keyboard housing. In operation, the weighing unit outputs weight measurement signals along signal lines to one of a variety of processing and/or display devices so that, for example, postage for the item being weighed may be calculated. The electronic scale may also be incorporated within a housing having an attachment device for removably or permanently attaching the housing to any surface desired.

25 Claims, 5 Drawing Sheets

ELECTRONIC SCALE

This application is a continuation of U.S. patent application Ser. No. 09/303,663, filed May 3, 1999, now U.S. Pat. No. 6,194,671.

BACKGROUND OF THE INVENTION

1. Field of the Invention

This invention generally relates to weighing systems, and more particularly to an electronic scale and a system and method which uses the electronic scale to compute postal and private carrier rates for letters, packages, parcels, and other items of mail.

2. Description of the Related Art

Even with E-mail and other forms of electronic data transfer which are so prevalent today, traditional mail, either through the U.S. Postal Service or by private carrier, remains the dominant form of information exchange. In order to successfully send an item through the mail, correct postage must, of course, be computed. To determine postage, a number of factors must be taken into consideration, not the least of which include the class, destination, and weight of the item being sent. At least three methods are currently in use for determining the weight of mail, and as will be apparent below all of them fall short of being optimum.

The traditional method of weighing mail involves using an analog scale. According to this method, a letter is weighed on the scale and postage is then determined by comparing the scale measurement to a rate table issued by a mail carrier. This method has proven to be inefficient, especially for businesses, because it is an entirely manual process. To mail a letter, for example, a secretary is often required to go to a mail room to access the scale and rate tables. In other instances, the scale is kept at the secretary's desk, making a trip to the mail room unnecessary. Even under these circumstances, however, the process is inefficient because keeping the scale on the secretary's desk reduces her usable work space. Either way, the traditional method of computing postage is inefficient.

An improved method of computing postage involves using an electronic, programmable postal meter. Electronic postal meters are highly favored by businesses because they essentially automate the mailing process. While meters of this type come in varying sizes, from small stand-alone units to full-size systems capable of weighing packages of varying weights and sizes, all have the same basic features: a keyboard for entering rate data into a meter memory, an electronic scale, and a processor for computing postage based on the stored rate data and weight measurements taken by the scale. U.S. Pat. Nos. 5,724,245, 5,615,120, 4,814,995, and D 305,103 disclose meters of this type.

In spite of their advantages, electronic postal meters have at least three drawbacks. First, postal meters cannot be bought but only rented for a fee. These rental fees contribute to operating expenses, and sometimes significantly depending upon the size of the renter.

Second, electronic postal meters require considerable maintenance because, one, the scales connected to the meters must be manually adjusted every time new postal rates are issued and, two, the meters must be periodically inspected, serviced, and replaced, often at additional expense to the renter.

Third, most electronic postal meters in use today are of a size which, in practical terms, are unsuitable for use on a worker's desk. Consequently, postal meters are almost universally kept in mail rooms and thus have associated with them many of the inefficiencies attendant to analog scales.

A further improved method of computing postage borrows from the power of the personal computer. This method eliminates the need for electronic postal meters because the functions performed by the meter processor are replaced by a CPU running a postal computation program. Computer programs of this type, exemplified by U.S. Pat. No. 5,606,507 to Kara, are typically Windows-type programs which automatically compute postage based on weight measurements taken by an electronic scale connected to a communications port of the computer. Once postage has been computed, the program instructs a peripheral device to print an envelope or label bearing a stamp of appropriate value.

Use of a personal computer to compute postage represents a significant improvement in the art. Through the computer, a secretary can, for example, perform all mailing responsibilities at her desk, thereby streamlining the mailing process. Further, through a convenient and easily understandable graphic user interface, novices can in no time learn to use the postal program with a proficiency equal to that of trained personnel. Also, because postal programs can be purchased, they do not represent a continuing economic burden on the businesses which use them.

For all of their advantages, software-based mailing systems are not optimum because they are not fully integrated. Perhaps most significantly, while the processing functions of the electronic postal meter have been incorporated into the personal computer, its hardware components have not. This is exemplified by systems like Kara, discussed above, which still must use an electronic scale separate from the computer to obtain the weight measurements required for computing postage. Use of a separate scale is inefficient because, like an analog scale, it consumes desk space which could be put to more productive use.

A need therefore exists for a system for computing postal and carrier rates which is fully integrated so that desk space is not unnecessarily consumed and which therefore is more convenient and efficient compared with postage-computing systems presently in use.

SUMMARY OF THE INVENTION

It is one object of the present invention to provide a system for computing postage and/or private carrier rates which is more efficient than those presently in use.

It is another object of the present invention to achieve the above object by integrally forming an electronic scale into the housing of a computer keyboard, so that all elements for computing rates are conveniently and compactly located on a user's desk, thereby streamlining the mailing process and increasing the work space available to an individual in a home or business environment.

It is another object of the present invention to provide a an electronic scale having an attachment means for either permanently or removably attaching the scale to virtually any surface, whether vertical or horizontal, flat or curved, smooth or rough, to thereby improve a worker's usable space as well as his or her convenience of using the scale.

The foregoing and other objects of the invention are achieved by providing an electronic scale which, in a first embodiment, is built into the housing of a computer keyboard. The electronic scale includes a platform for supporting an item of mail such as a letter, and a weighing unit having at least one support arm for transferring the weight of the mail item from the platform to a load cell mounted within the keyboard housing. In operation, an item to be mailed is placed on the platform. The weight of the letter causes the support art to impinge against the load cell, and resulting weight measurement signals are output to a display unit and/or a processor to allow a postage computation to be performed. The load cell may be powered from electrical lines connected to the keyboard, or may be battery powered.

A second embodiment of the present invention includes substantially the same features as the first embodiment except that the platform is removably connected to allow different types of platforms and holders to be connected to the weighing unit.

A third embodiment of the present invention includes: a weighing platform; a housing containing a weighing unit and a force transducer; and a means for attaching the housing to a work surface. The weighing unit includes two support members having a first end connected to the platform and a second end mounted interior to the housing. The support members may be provided with springs to allow the platform to deflect against the force transducer during weighing. The attachment means may be of any conventional type for allowing the housing to either permanently or removably attach to a work surface to thereby maximize a worker's usable work space.

DESCRIPTION OF THE PREFERRED EMBODIMENTS

Figure 1:
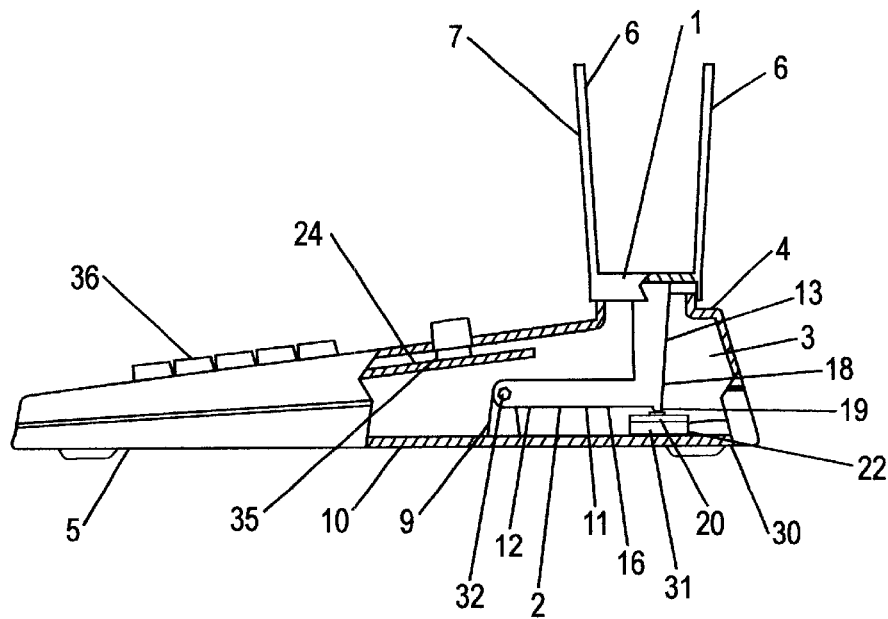
FIG. 1 is a diagram showing a sectional view of a first embodiment of the electronic scale of the present invention.
Figure 2:
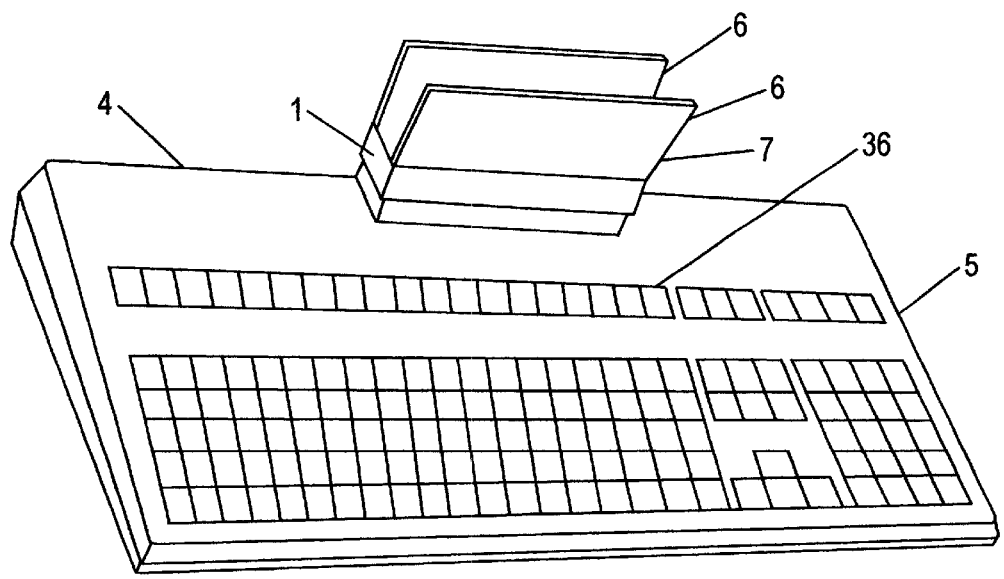
FIG. 2 is a diagram showing a frontal view of the first embodiment of the scale.

Referring to FIGS. 1 and 2, a first embodiment of the electronic scale of the present invention includes a platform 1 and a weighing unit 2 integrated into clearance region 3 within a rear portion 4 of a keyboard housing 5. The clearance region may be at least partially disposed under a keyboard printed wiring board 24 having switches 35 connected to keys 36.

The platform is equipped with at least two side walls 6 to form a container 7 for holding items of mail. Preferably, container 7 has dimensions sufficient to accommodate letters, envelopes, and packages of varying sizes.

Weighing unit 2 includes a pivot mount 9, a pivot arm 11, and a force transducer in the form of load cell 20 mounted on a stage 31. Pivot mount 9 is fixed to an interior surface 10 of the keyboard housing. Pivot arm 11 has a first end 12 rotatably connected to the pivot mount by a pin 32 and a second end 13 in contact with a bottom surface 14 of the platform through a slot 43 along a top surface of the keyboard housing. Preferably, the pivot arm is constructed from two smaller arm portions 16 and 17 which are angularly attached, e.g. at right angles, to form an elbow area 18.

Load cell 20 may be of any conventional type with a suitable weight capacity. While the force transducer of the invention is specifically described herein as a load cell, those skilled in the art can appreciate that other types of force transducers, including digital or analog, may be used. Further, load cell 20 may be powered by any conventional means. For example, load cell 20 may draw power from the electrical lines connecting the keyboard to a CPU unit, or may be battery powered.

Projecting from the elbow area of arm 11 is a stub 19 located adjacent load cell 20, which is fixed to a raised interior surface of the keyboard housing base 30. If desired, arm 11 may be upwardly biased so that stub 19 does not contact load cell 20 when container 7 is empty, or arm 11 may be arranged so that stub 19 and load cell 20 are always in contact.

In operation, an item to be mailed, preferably enclosed within an envelope or the like, is placed in container 7 by a user. The weight of the letter applies a force to pivot arm 11, which is transmitted to load cell 20 through stub 19. Load cell 20 converts this force into weight measurement signals which are then conveyed through signal lines 22. The signal lines may carry the weight measurement signals to several locations for processing and/or display. For example, signal lines may carry the weight measurements signals from load cell 20 to an LCD display. Alternatively, the signal lines may carry the weight measurement signals to the CPU of a personal computer for processing.

Figure 3A:
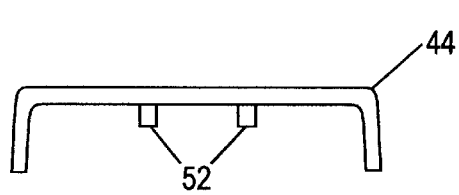
FIGS. 3(*a*) and 3(*b*) are diagrams of alternative platforms/holders that may be used in accordance with the present invention.
Figure 3B:
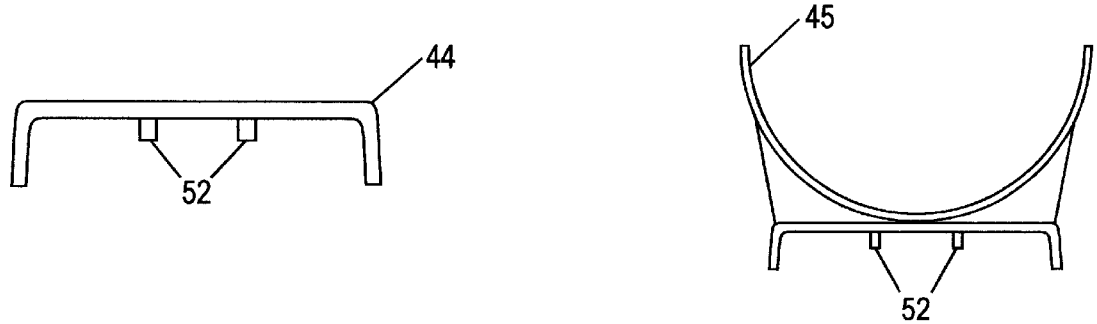
Figure 4:
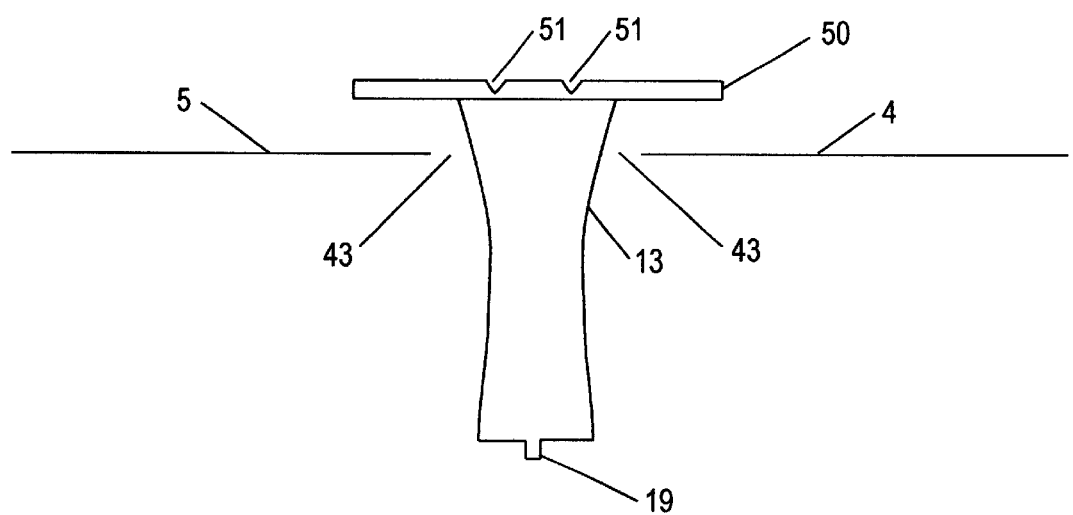
FIG. 4 is a diagram showing a second embodiment of the electronic scale of the present invention having a coupling member with holes for accommodating removable platforms/holders.

The weighing platform of the present invention may be removably connected to the pivot arm of the weighing unit by any means conventionally known, so that platforms/holders 44 and 45 of other shapes and sizes such as shown respectively in FIGS. 3(*a*) and 3(*b*) may be used. For example, in a second embodiment of the electronic scale of the present invention shown in FIG. 4, to accommodate a removable platform/holder, the support arm end 13 may be fixed to a coupling member 50 disposed outside the keyboard housing. The coupling member may include holes 51 for receiving extensions 52 at the bottom of the platform/holder to establish a snap fit connection.

Figure 5:
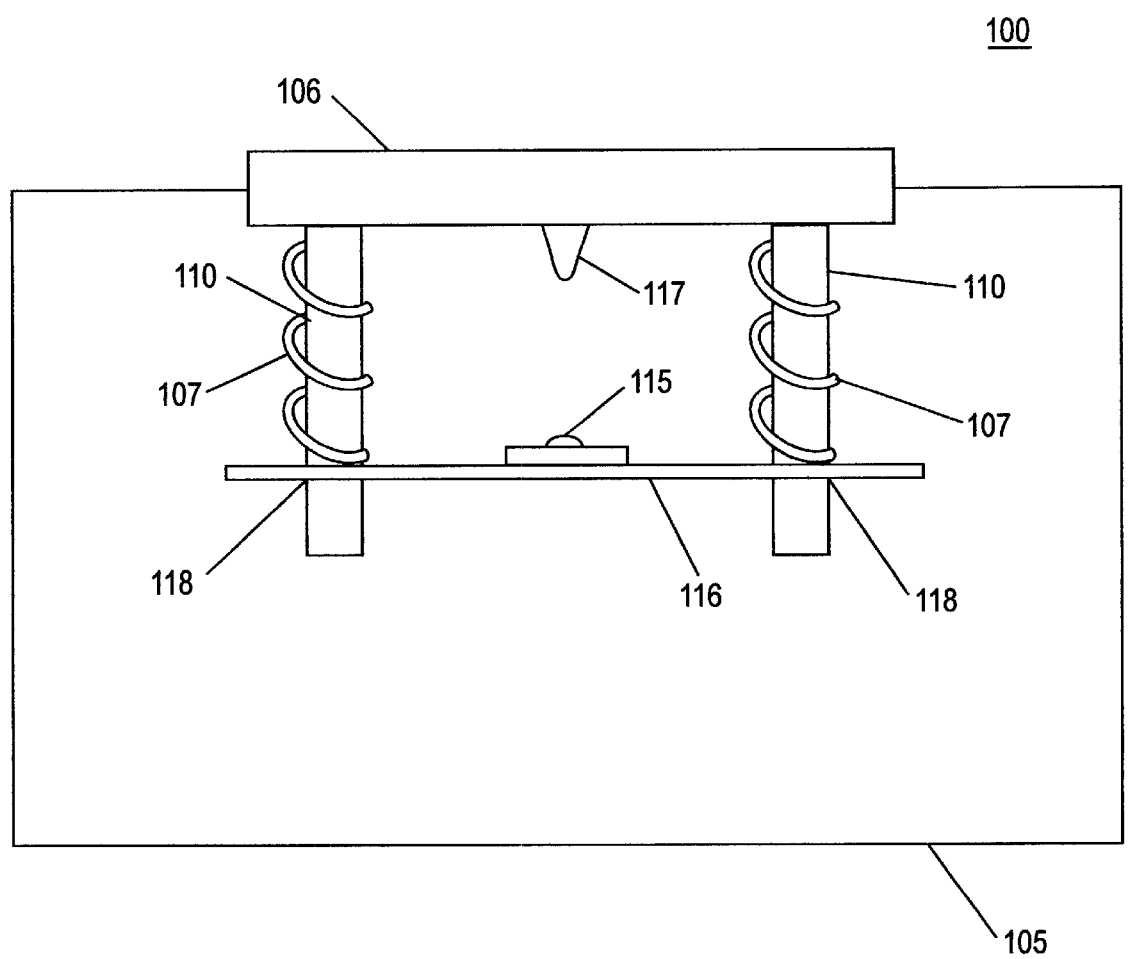
FIG. 5 is a diagram showing a third embodiment of the electronic scale of the present invention.

Referring to FIG. 5, a third embodiment of the electronic scale 100 of the present invention includes a housing 105 and a platform 106 connected to a weighing unit formed from two support shafts 110 and a load cell 115. If desired, platform 106 may be removably attached to the weighing unit in a manner analogous to that shown in FIG. 4 to allow attachment of different platforms/holders such as those shown in FIGS. 3A and 3B.

Within the housing, load cell 115 is preferably fixed to a base 116 at a position directly underneath a stub 117 projecting from a bottom surface of the platform. Holes 118 are formed in the base to provide clearance for the shafts and thus to allow stub 117 to impinge against the load cell when an item of mail is placed on the platform. Preferably, as shown, the support shafts are equipped with springs 107 to, for example, allow stub 117 to impinge upon the load cell and to give the platform a predetermined bias. Additional supports (not shown) may be included, as necessary, for increasing the stability of the support shafts. Although not shown, the load cell is connected to signal lines for carrying weight measurement signals either to a display (e.g., an LCD display) or a CPU for display on a computer screen and/or to be used in a postage computation.

In addition to these features, the electronic scale of the third embodiment is equipped with a means for attaching housing 105 to virtually any vertical or horizontal surface, which may be a wall, a kitchen appliance, an office area, or any other work surface where a scale is needed. The invention is particularly well suited for attachment to a piece of desk equipment (e.g., a CPU unit, a CRT monitor, a printer, or a flat surface of a keyboard) to increase worker's usable space.

The attachment means may be of any type conventionally known and is selected depending upon, for example, the shape, curvature, roughness, texture and other physical attributes of the attachment surface. Further, the attachment means may be selected to either permanently or removably attach the housing to the surface desired.

Figure 6:
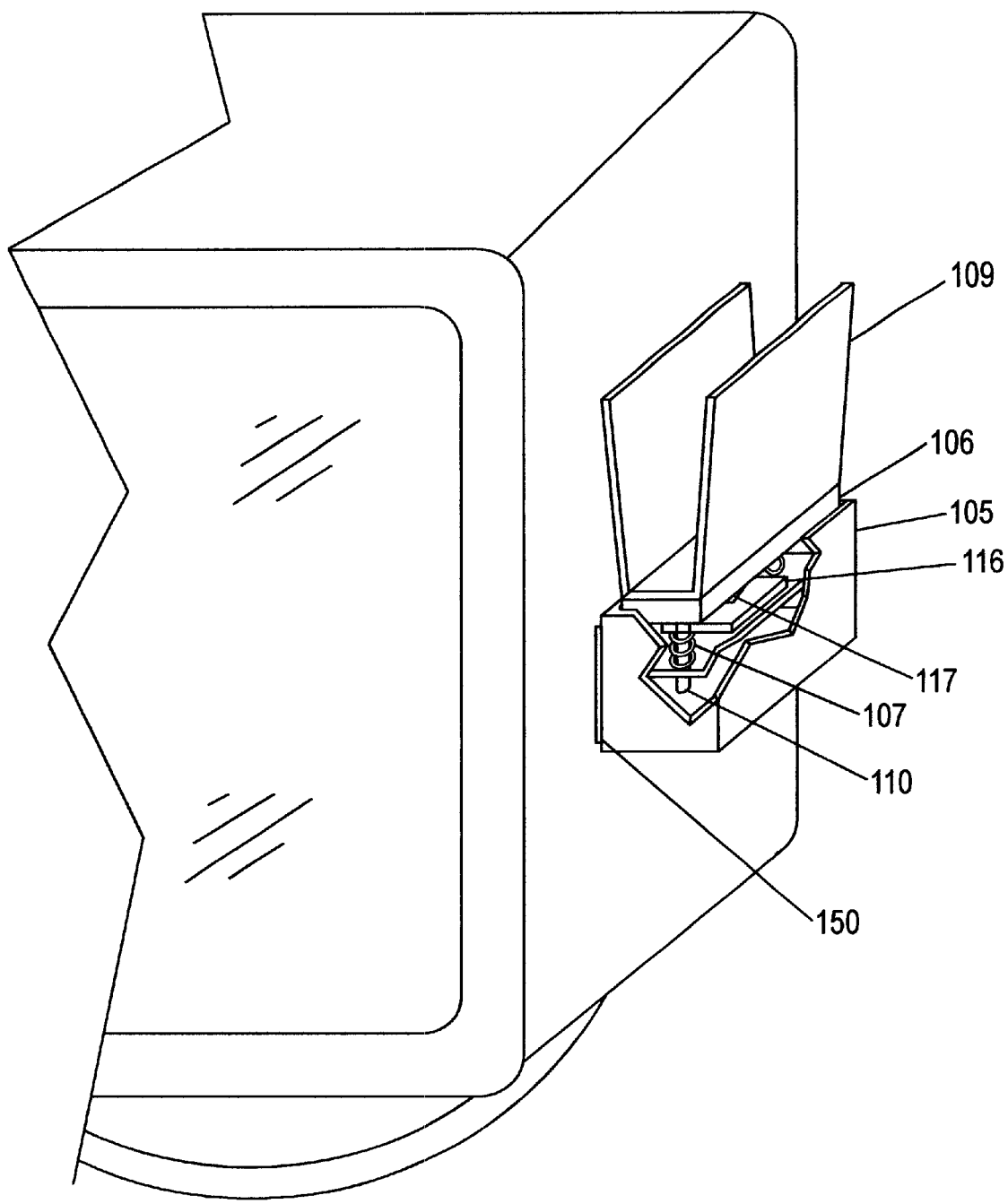
FIG. 6 is a diagram of an exemplary attachment means used to attach a housing of the electronic scale shown in FIG. 5 to a work surface such as a CRT monitor.
Figure 7:
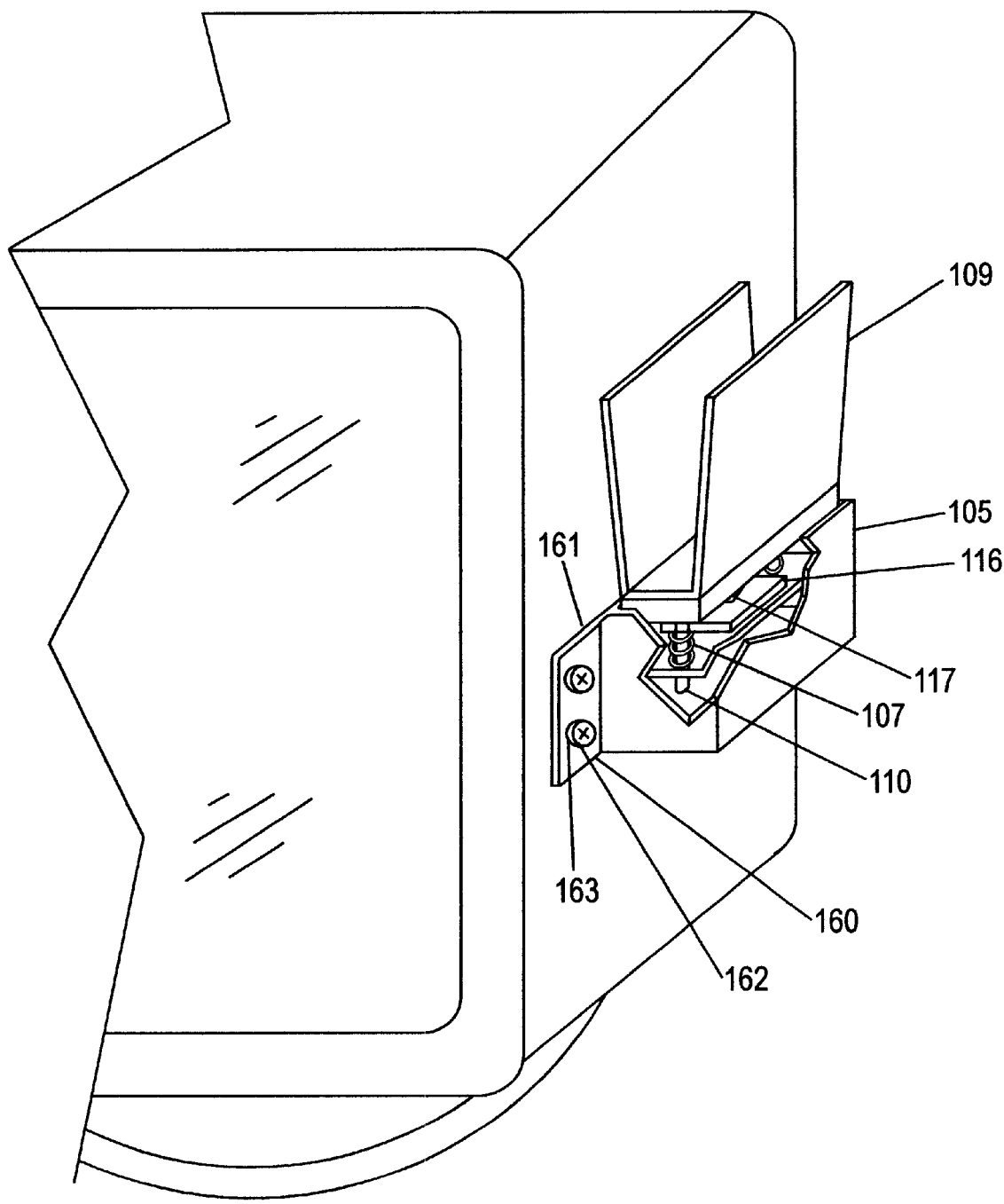
FIG. 7 is a diagram of another exemplary attachment means used to attach a housing of the electronic scale shown in FIG. 5 to a work surface such as a CRT monitor.

FIGS. 6 and 7 show two exemplary types of attachment means of the present invention. In FIG. 6, housing 105 is shown as containing an adhesive 150 for fixing the housing to the vertical side surface of a CRT monitor. FIG. 6 also shows that platform 106 may be adapted, in the manner shown in FIG. 4, to accommodate a holder 109 for weighing items. In FIG. 7, housing 105 contains a plate 160 having flange portions 161 on either side (only one of which is shown). The flange portions contain at least one and preferably two holes 162 per flange for receiving screws 163. Through the attachment means of the present invention, a worker can conveniently weigh items such as mail, documents, and the like without consuming desk space. Further, the worker can remove the housing and place it at another location or another surface (e.g., a slide out drawer of a desk) for ease and convenience of use.

The Inventor of the present invention emphasizes that the attachment means shown in FIGS. 6 and 7 are only illustrative of the invention. As one skilled in the art can appreciate, other attachment devices such as clamps, clips, pins, nails, fasteners, cables, dowels, hooks, joints, latches, bands, rope, snaps, lugs, rivets, velcro, bonding agents, suction cups, and magnets for attachment to metal surfaces can just as easily be used.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. A weighing arrangement, comprising:
   a platform;
   a housing which includes a force transducer, said force transducer outputting a weight signal corresponding to a weight of an item when said item is placed on said platform;
   a means for attaching said housing; and
   a display for a personal computer, said means attaching said housing to said display, wherein said attaching means is the sole means of supporting said housing.

2. The weighing arrangement of claim 1, further comprising:
   a support for said platform, said support transferring the weight of said item to said force transducer.

3. The weighing arrangement of claim 1, wherein said force transducer has a sensitivity range for weighing items of mail.

4. The weighing arrangement of claim 1, wherein said attaching means removably attaches said housing to said display.

5. The weighing arrangement of claim 1, wherein said attaching means attaches said housing to said display in a manner which makes said platform immediately accessible for weighing said item.

6. A weighing arrangement, comprising:
   a platform;
   a housing which includes a force transducer, said force transducer outputting a weight signal corresponding to a weight of an item when said item is placed on said platform;
   a fastener; and
   a display for a personal computer, said fastener attaching said housing to said display and solely supporting said housing.

7. The weighing arrangement of claim 6, further comprising:
   a support for said platform, said support transferring the weight of said item to said force transducer.

8. The weighing arrangement of claim 6, wherein said force transducer has a sensitivity range for weighing items of mail.

9. The weighing arrangement of claim 6, wherein said fastener removably attaches said housing to said display.

10. The weighing arrangement of claim 6, wherein said fastener attaches said housing to said display in a manner which makes said platform immediately accessible for weighing said item.

11. A method for weighing an item, comprising:
    attaching an electronic scale to a display of a personal computer, said electronic scale including a platform and a force transducer;
    placing an item on said platform to cause said platform to apply a force to said force transducer; and
    outputting a signal from said force transducer indicative of a weight of said item,
    wherein said attaching step includes attaching the electronic scale in a manner which results in the electronic scale being solely supported by said display of the personal computer.

12. The method of claim 11, further comprising:
    displaying the weight of said item on said display.

13. The method of claim 11, further comprising:
    displaying the weight of said item on an LCD display.

14. A weighing arrangement, comprising:
    a platform;
    a housing which includes a force transducer, said force transducer outputting a weight signal corresponding to a weight of an item when said item is placed on said platform;
    a fastener; and
    a CPU for a personal computer, said fastener attaching said housing to said CPU and solely supporting said housing.

15. The weighing arrangement of claim 14, wherein said fastener removably attaches said housing to said CPU.

16. A weighing arrangement, comprising:
    a platform;
    a housing which includes a force transducer, said force transducer outputting a weight signal corresponding to a weight of an item when said item is placed on said platform;
    a means for attaching said housing; and
    a CPU for a personal computer, said means attaching said housing to said CPU and being the sole means of supporting said housing.

17. A weighing arrangement, comprising:

a platform;

a housing which includes a force transducer, said force transducer outputting a weight signal corresponding to a weight of an item when said item is placed on said platform;

a fastener; and a printer, said fastener attaching said housing to said printer and solely supporting said housing.

18. The weighing arrangement of claim 17, wherein said fastener removably attaches said housing to said printer.

19. A weighing arrangement, comprising:

a platform;

a housing which includes a force transducer, said force transducer outputting a weight signal corresponding to a weight of an item when said item is placed on said platform;

a means for attaching said housing; and a printer, said means attaching said housing to said printer and being the sole means of supporting said housing.

20. A weighing arrangement, comprising:

a platform;

a housing which includes a force transducer, said force transducer outputting a weight signal corresponding to a weight of an item when said item is placed on said platform;

a fastener; and a keyboard for a personal computer, said fastener attaching said housing to said keyboard and solely supporting said housing.

21. The weighing arrangement of claim 20, wherein said fastener is the sole attaches said housing to said keyboard.

22. A weighing arrangement, comprising:

a platform;

a housing which includes a force transducer, said force transducer outputting a weight signal corresponding to a weight of an item when said item is placed on said platform;

a means for attaching said housing; and a keyboard for a personal computer, said means attaching said housing to said keyboard and being the sole means of supporting said housing.

23. A method for weighing an item, comprising:

attaching an electronic scale to a CPU of a personal computer, said electronic scale including a platform and a force transducer;

placing an item on said platform to cause said platform to apply a force to said force transducer; and outputting a signal from said force transducer indicative of a weight of said item, wherein said attaching step includes attaching the electronic scale in a manner which results in the electronic scale being solely supported by the CPU of the personal computer.

24. A method for weighing an item, comprising:

attaching an electronic scale to a keyboard of a personal computer, said electronic scale including a platform and a force transducer;

placing an item on said platform to cause said platform to apply a force to said force transducer; and outputting a signal from said force transducer indicative of a weight of said item wherein said attaching step includes attaching the electronic scale in a manner which results in the electronic scale being solely supported by the keyboard of the personal computer.

25. A method for weighing an item, comprising:

attaching an electronic scale to a printer, said electronic scale including a platform and a force transducer;

placing an item on said platform to cause said platform to apply a force to said force transducer; and outputting a signal from said force transducer indicative of a weight of said item, wherein said attaching step includes attaching the electronic scale in a manner which results in the electronic scale being solely supported by said printer.

* * * * *